March 2, 1943. C. B. DEMANN 2,312,883
REFRIGERATING APPARATUS
Filed Aug. 23, 1939 3 Sheets-Sheet 2

INVENTOR.
Clemens B Demann
BY Spencer Hardman and Fehr
ATTORNEYS

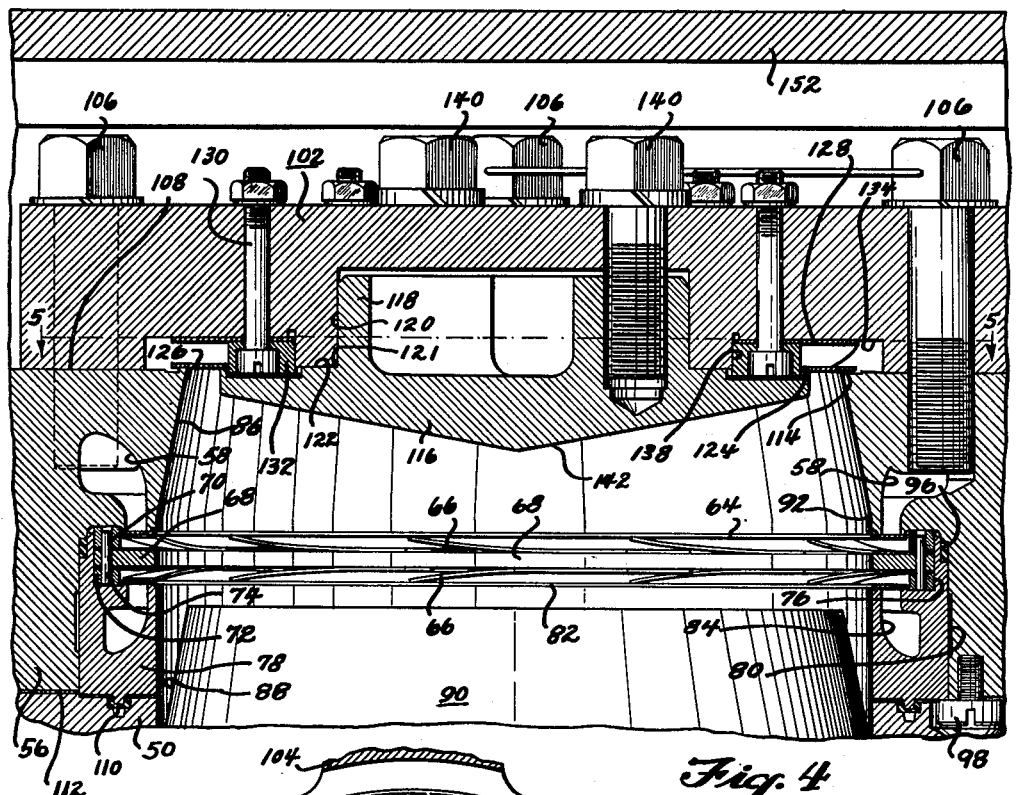
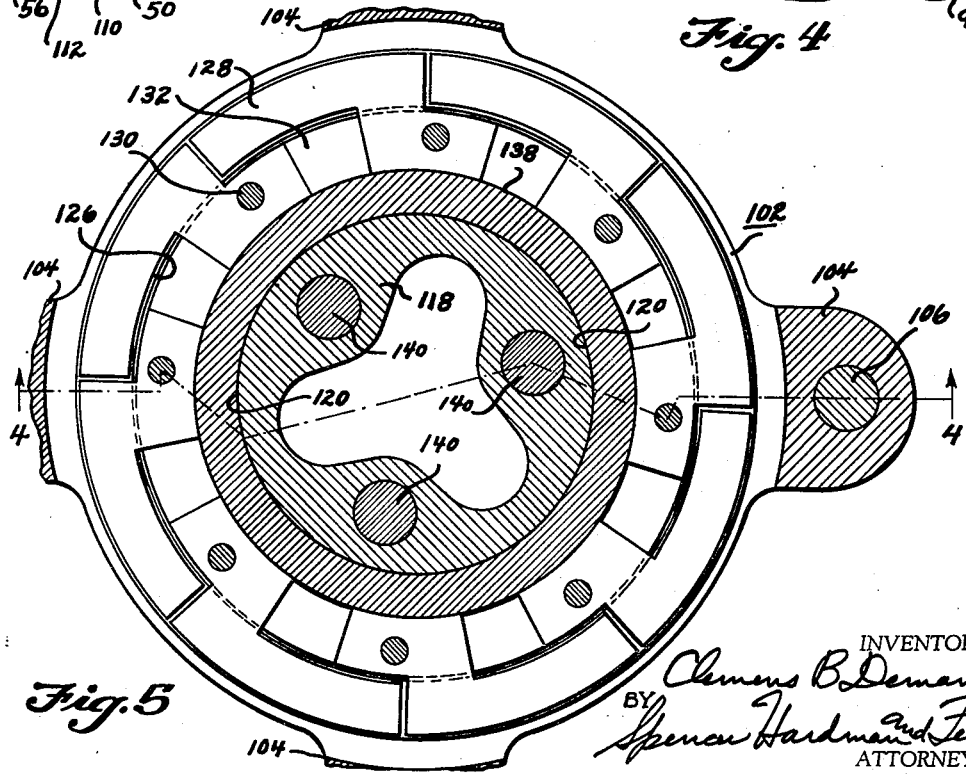

Patented Mar. 2, 1943

2,312,883

UNITED STATES PATENT OFFICE 2,312,883

REFRIGERATING APPARATUS

Clemens B. Demann, Dayton, Ohio, assignor to General Motors Corporation, Dayton, Ohio, a corporation of Delaware Application August 23, 1939, Serial No. 291,573

6 Claims. (Cl. 230—231)

This invention relates to refrigerating apparatus and more particularly to compressors.

It is an object of my invention to provide a compressor which will operate efficiently at relatively high speeds and which will have a minimum clearance volume and will maintain a high volumetric efficiency throughout all operating speeds.

It is another object of my invention to provide a compressor having inlet and discharge valves having ample capacity which will be quiet at all speeds.

It is still another object of my invention to provide a compressor with inlet and outlet valves of ample capacity located entirely within the cylinder walls and having a minimum of clearance volume.

Further objects and advantages of the present invention will be apparent from the following description, reference being had to the accompanying drawings, wherein a preferred form of the present invention is clearly shown.

In the drawings:

Fig. 4 is a sectional view taken along the lines 4—4 of Fig. 5; and

Fig. 5 is a sectional view taken along the lines 5—5 of Fig. 4.

Briefly, I have shown a reciprocating compressor having a piston and cylinder, each having a lower cylindrical portion and an upper truncated cone-shaped portion. A discharge valve is provided in the cylinder head and two opposed inlet valves are provided in the cylinder walls adjacent the junction between the cylindrical portion of the conical portion of the cylinder wall. The piston has projections extending and substantially filling the discharge passages in the cylinder head and the inlet valves are constructed so as to provide a very small clearance volume. The valve inlet passages are sufficiently large and are streamlined so as to permit the compressor to operate efficiently at relatively high speeds such as 600 R. P. M.

Figure 1:
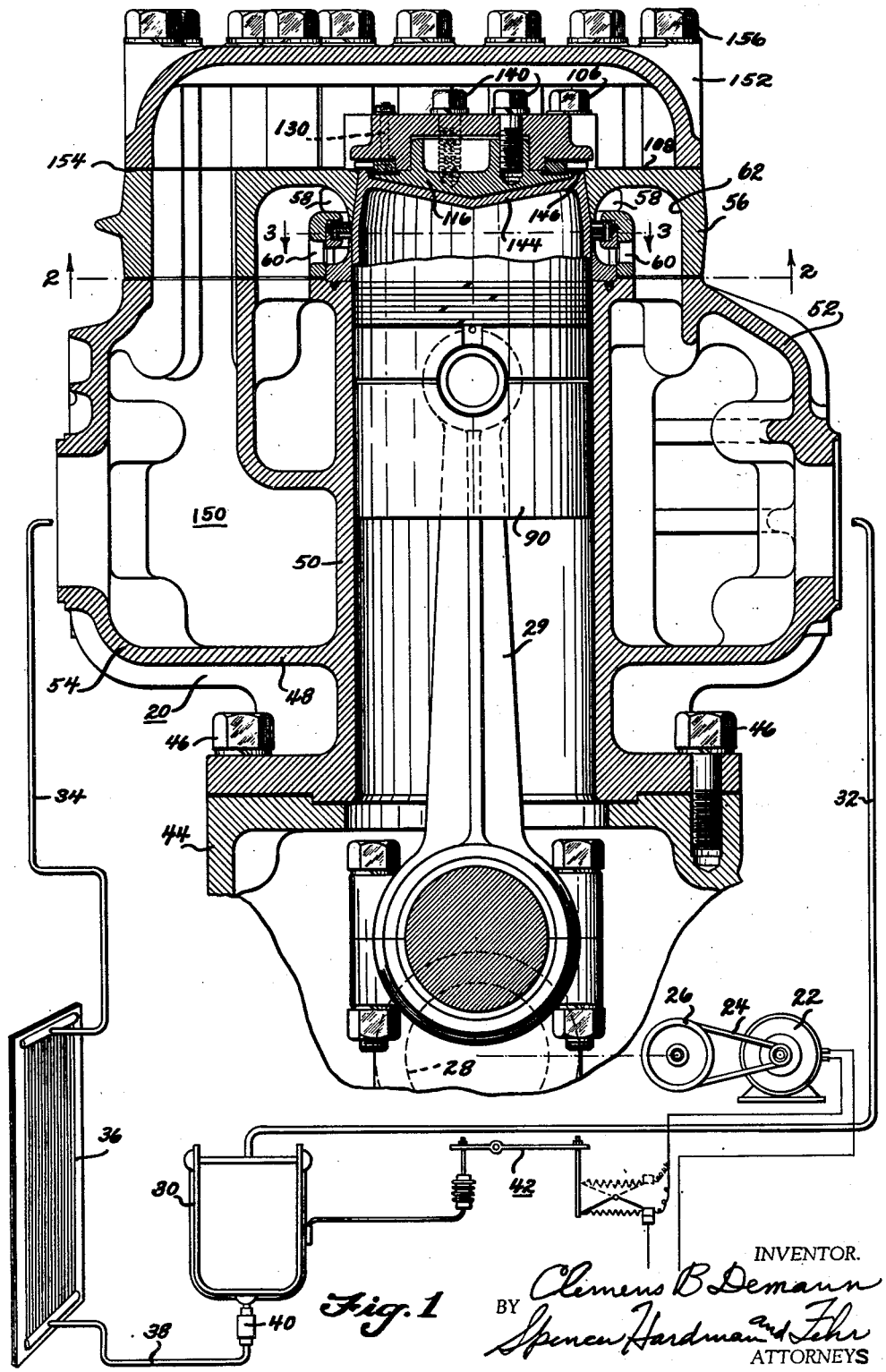
Fig. 1 is a sectional view of one form of my compressor together with the remaining elements of a refrigerating system diagrammatically illustrated.
Figure 2:
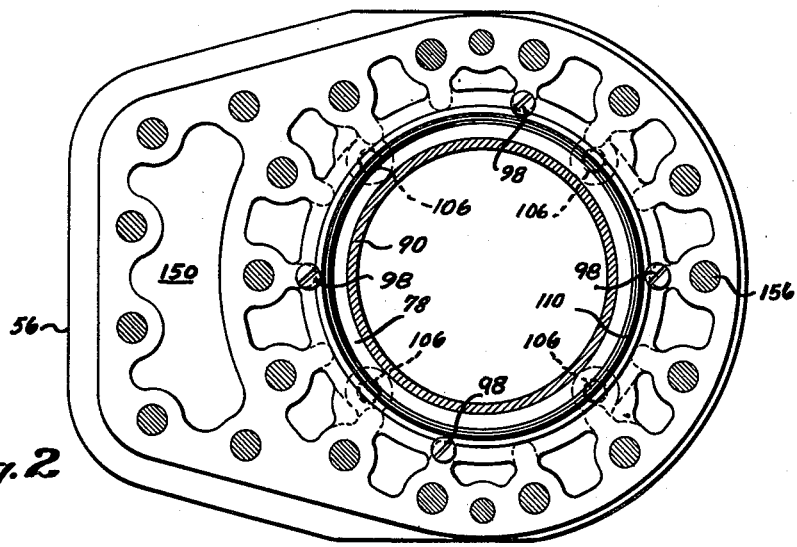
Fig. 2 is a sectional view taken along the lines 2—2 of Fig. 1.

Referring now to the drawings and more particularly to Fig. 1 there is shown a refrigerating system including a compressor 20 driven by an electric motor 22 through a belt 24 and a pulley 26 which is fastened to the outer end of the crankshaft 28 of the compressor. The compressor 20 withdraws refrigerant from the evaporating means 30 through a suction conduit 32 and forwards the compressed refrigerant through a supply conduit 34 to a condenser 36 where the compressed refrigerant is liquefied. A liquid conduit 38 conducts liquid refrigerant to a restrictor 40 which controls the flow of liquid refrigerant into the evaporator 30. The operation of the compressor and the electric motor 22 is controlled by a snap acting switch 42 which has its thermostat bulb in heat exchange relation with the evaporator 30.

The compressor 20 includes a crankcase casting 44 which contains the crankshaft 28. The crankshaft 28 is connected by the connecting rod 29 to the piston pin of the piston 90. Fastened to the top of the crankcase casting 44 by cap screws 46 is the cylinder casting 48 which includes the cylinder wall 50 as well as an inlet jacket 52 which surrounds the upper portion and one side of the cylinder wall 50 and an outlet jacket 54 which surrounds a small portion of the inlet jacket 52 and the other side of the cylinder wall 50.

The inlet valves are not located within the casting 48 but a separate casting 56 is clamped on top of the upper surface of the casting 48 and the inlet valves are embodied in this casting 56. This casting 56 forms the upper portion of the inlet jacket as well as the upper portion of the cylinder wall. I have evolved an unusual and highly efficient arrangement for the upper end of the piston, the cylinder head and the valves. Each cylinder of the compressor is provided with dual inlet valve passages 58 and 60, which are formed in the casting 56 and communicate with a large common passage 62 also formed in the casting 56 which leads down into the portion of the jacket 52 which is a part of the casting 48. This passage 62 extends straight upwardly from the interior of the jacket 52 and curves around with a gradually reduced cross-section until it reaches the valve seat located at the mouth of the passage 58. This gradually reduced cross-section of the passage 58 with its rounded turns provides substantially a streamlined flow from the jacket 52 to the mouth of the passage 58.

Figure 3:
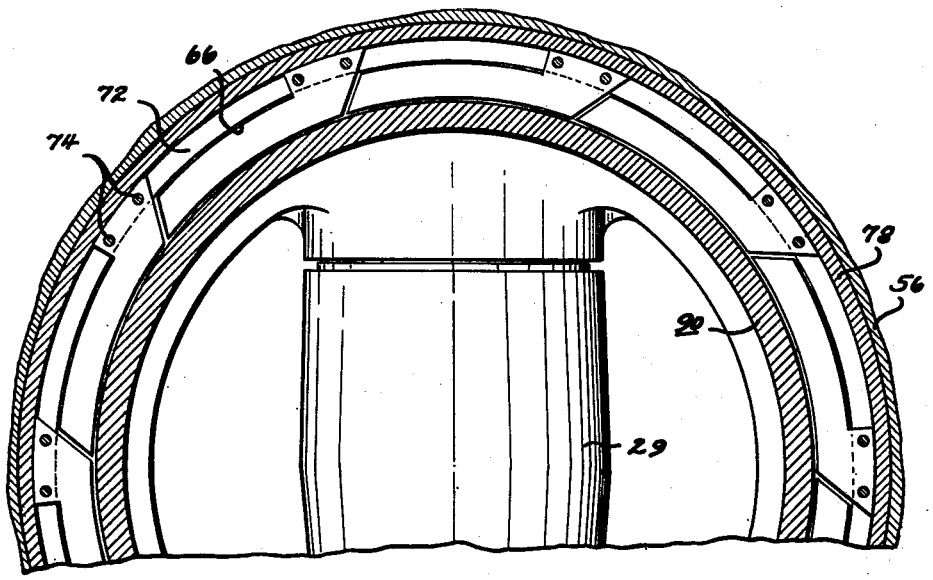
Fig. 3 is a sectional view taken along the lines 3—3 of Fig. 1.

The mouth of the passage 58 is provided with a set of concentric annular valve seats having a ground and polished finish for receiving the annular valve 64 which is formed of very thin spring steel. These valve seats are in the form of small annular projections provided upon either side of the mouth of the passage 58. The valve 64 is normally held in contact with this valve seat by a plurality of Z-shaped leaf springs 66 arranged in a circle as best shown in Fig. 3. These leaf springs are clamped to a middle ring 68 by an upper ring 70 and a lower ring 72. The anchoring end of each of these leaf springs is held in position by pairs of pins 74 which serve to locate the leaf springs. As a further help in locating the leaf springs this assembly is set to a recess 76 in an insert 78 which in turn is placed in a recess 80 provided in the casting 56. It should be noted that the free ends of the leaf springs 66 extend upwardly and downwardly from the middle ring 68. These leaf springs are made individually instead of in the form of a ring so that the grain of the spring steel used will extend longitudinally of the leaf spring. This is highly important because otherwise the leaf springs would readily break. It is therefore important that the grain of the steel used extend in a substantially straight line from the free end of the leaf spring to the anchoring end. This will assure freedom from breakage.

The downwardly extending leaf springs 66 serve to hold the lower valve 82 onto its seat which is formed by shoulders at the mouth of the streamlined passage 84 which is provided in the insert 78. This streamlined passage 84 connects with the passage 60 which is shown in Fig. 1. At the mouth of the streamlined passage 84 annular projecting shoulders are provided in the insert 78 for providing a seat for the valve 82. These shoulders are provided with a ground finish so as to make a tight seal. It should be noted that these inlet valves 64 and 82 are located just below the truncated conical portion 86 at the upper end of the cylinder wall 50. The piston 90 is also provided with a truncated upper portion 88 which is shaped to fit the truncated portion 86 of the cylinder 50. It will be seen that the truncated portion 86 of the cylinder 50 begins at the point indicated by the reference character 92. This point is an extremely short distance above the opening into the cylinder proper provided between the valve 64 and the middle ring 68. Below this there is also an opening directly into the cylinder provided between the middle ring 68 and the valve 82.

The piston 90 also has a similarly located point or shoulder at which the truncated portion 88 begins. As soon as this point on the piston passes the shoulder or seat on which the valve 64 is seated the clearance space for both the upper and lower inlet valves will be entirely shut off. Prior to this point there will be a narrow passage between the two truncated portions 86 and 88 as well as a narrow passage across the top of the piston which would have access to this clearance space. However, after the point on the piston is past the seat of the valve 64, the clearance space for both the valves 64 and 82 is shut off by the piston. This clearance space referred to is provided between the valve 64 when on its seat and the middle ring 68 as well as between the valve 82 when on its seat and the middle ring 68. Upon the down stroke of the piston away from the cylinder head the piston is only required to move the short distance between the point 92 and the shoulder where the valve 64 is normally seated before the clearance space for the valve 64 is uncovered to permit the valve 64 to open and to allow gas to flow into the upper end of the cylinder between the truncated portions 86 and 88. This point 92 may be made directly at the point where the valve 64 is located or it may be placed a small distance upwardly therefrom as noted by the reference character 92. This amount will largely depend upon the accuracy and the amount of clearance provided between the top of the piston and the top of the cylinder.

The inlet valves 64 and 82 as well as the rings 70 and 72, the middle ring 68 and the leaf spring 66 form an assembly which is inserted in the recess 76 of the insert 78 prior to the assembly of the cylinder. After this, the insert 78 is fitted into the recess 80 of the casting 56. A gasket 96 of a rubber-like or soft metal material is provided for preventing the escape of compressed refrigerant from the cylinder into the inlet passage. The insert 78 is firmly held in place in the casting 56 by large headed screws 98 which are threaded into the casting 56 and have their heads overlapping the insert 78 to firmly hold the insert 78 in the casting 56. The casting 56 rests upon the main cylinder casting 48 and a tongue and grooved type of gasket seal 110 is provided between the insert 78 and the cylinder wall portion 50 of the casting 48. A flat gasket 112 is provided between other portions of the casting 56 and the casting 48. With this gasket arrangement the insert 78 is effectually sealed to the casting 56 and 48.

The cylinder head proper is formed by a four eared casting 102, the best shown in Figs. 4 and 5. This casting, as heretofore indicated, is provided with four ears 104 having their lower surfaces finish ground and fastened by cap screws 106 to a finish ground surface 108 provided on top of the casting 56. The top of the casting 56 is provided with a shoulder providing an outer discharge valve seat 114. This shoulder is finish ground and is plane and parallel to the finish ground surface 108 to which the ears 106 are clamped. The four eared member 102 carries a cylinder head insert 116 having a cylindrical insert portion 118 which extends into a cylindrical recess 120 provided in the four-eared member 102. This cylinder head insert 116 is provided with a finish ground shoulder 122 which rests upon another finish ground shoulder surrounding the recess 120. This finish ground shoulder is in the same plane as the finish ground surfaces of the ears 104. This arrangement of finish ground plain surfaces thereby places the valve seat 114 as well as the surfaces of the ears 104 and the shoulder 122 in the same planes. Therefore it is possible to provide by finish grinding a valve seat 124 upon the rim of the insert 116 in the same plane as the valve seat 114. In practice the surface 108 and the valve seat 114 are finish ground in the same plane in one operation and the shoulder or surface 121 and the bottom of the ears 106 are finish ground in the same plane in another single operation. Also the shoulder 122 and the valve seat 124 are finish ground in the same plane in still another single operation. It is thus apparent that when all these surfaces are fastened together as shown, all will be in the same plane.

Thus the shoulder 124 is finish ground so as to make it the inner valve seat which is perfectly concentric and in the same plane as the outer valve seat 114. This makes it unnecessary to provide any connecting webs between the metal forming the two valve seats 114 and 124. It also makes it possible to provide an even flow of compressed gas all the way around the discharge opening which is provided between the two seats 114 and 124.

The discharge valve 126 is in the form of a thin ring of spring steel and is normally held in engagement with the seats 114 and 124 by Z-shaped valve springs 128 which have their anchoring ends located by the bolts 130 and clamped by a ring 132 which clamps the anchoring end of the springs 128 to the upper surface of a finish ground recess 134 in the member 102 which recess provides clearance to permit opening of the valve 126. This ring 132 is held in position by the bolts 130 which extend upwardly through the member 132. The insert 116 is applied to the member 102 after the ring 132 and the springs 128 are clamped in place. The springs 128 are further located by having their inner edges fitting tightly against the shoulder 138 which forms the inner edge of the recess 134. As in the case of the leaf springs 66 these springs 108 should be so made that the grain of the spring steel extends substantially in a straight line from the free end of the springs to their anchoring end. After the springs 128 and the ring 132 are clamped in place in the recess 134 the valve 126 is applied and then the insert 116 is fitted into position and clamped by the three cap screws 140. This makes a very simple and convenient valve assembly.

The insert 116 is provided with a downwardly tapered surface 142. This shape is desirable since it provides a thickness in accordance with the pressure stresses exerted upon the insert 116. It also makes it possible to provide a tapered head 144 for the piston 90 which makes it possible to make the upper end of the piston of a thinner wall section. The surface of the head of the piston is shaped to conform exactly to the surface 142 of the insert and in particular as a projecting shoulder 146 which extends into the passage between the inner and outer valve seats 124 and 114. This shoulder on the inside is beveled so as to prevent the trapping of any compressed gas in between the insert 142 and the top of the piston. By this arrangement substantially no clearance volume is provided and none is necessary. This makes it possible to provide a compressor of exceptionally high volumetric efficiency and a high overall efficiency at substantially all speeds. The recess 134 opens all the way around directly into the discharge chamber 150 so that very free discharge of compressed gas is provided.

The discharge chamber is covered by a top cover 152 provided with a sealing gasket 154 and is held in place by cap screws 156 which extend down through the casting 56 into the upper portion of the casting 48 so that these cap screws hold the entire upper portion of the compressor in place. The streamlined inlet passages together with the dual inlet valve and the leaf springs make it possible to admit a full charge of suction gas during each stroke even at high speeds. The location of the inlet valves adjacent to and concentric with the discharge valve helps to cool the cylinder head. The use of the leaf springs makes it possible to reduce the volume required for valve clearance. The discharge valve is of adequate area and provides a very direct discharge into the discharge chamber. All of the valves are light in weight and of comparatively small lift so that they are relatively quiet. All these factors contribute to the outstanding performance of this compressor.

This compressor is not limited to use in a refrigerating system but may be used in compressing gases for many other purposes.

While the form of embodiment of the invention herein disclosed, constitutes a preferred form, it is to be understood that other forms might be adopted, all coming within the scope of the claims which follow.

What is claimed is as follows:

1. A reciprocating compressor including a cylinder and a piston, said cylinder including a separate lower wall-forming portion, a separate upper wall-forming portion, and a cylinder head constituting a part separate from but connected to the upper wall-forming portion, and a valve assembly held between said upper portion and said lower portion.

2. A valve means for a compressor including a valve seat, an annular valve for making sealing contact with said valve seat, and a plurality of separate Z-shaped leaf spring members for holding said annular valve upon said seat, said members each having the grain of the metal extending longitudinally therethrough.

3. A compressor including a cylinder and a piston, the wall of said cylinder being provided with an annular downwardly opening inlet port means and an annular upwardly opening inlet port means located opposite each other, each of said port means extending around the cylinder wall, a substantially similar annular valve for each of said port means, and spring means bodily located between and acting directly upon said valves for holding said valves in engagement with said port means.

4. A compressor including a cylinder and a piston, the wall of said cylinder being provided with oppositely facing inlet ports of substantially equal size arranged in parallel gas flow relationship directly opposite each other, a valve for each of said inlet ports, and spring means extending directly between said valves for holding said valves in engagement with said ports.

5. A reciprocating compressor including a cylinder and a piston having a frusto-conical head, said cylinder including a separate lower wall-forming portion for supporting in sliding sealing relationship the lower cylindrical portion of the piston, said cylinder also including a separate upper wall-forming portion having walls complementary to the frusto-conical head of the piston, a separate cylinder head forming the top wall portion of the cylinder.

6. A reciprocating compressor including a cylinder and a piston having a frusto-conical head, said cylinder including a separate lower wall-forming portion for supporting in sliding sealing relationship the lower cylindrical portion of the piston, said cylinder also including a separate upper wall-forming portion having walls complementary to the frusto-conical head of the piston, a separate cylinder head forming the top wall portion of the cylinder, and a valve assembly held between the separate upper and lower wall-forming portions.

CLEMENS B. DEMANN.